United States Patent [19]
Rohrle et al.

[11] Patent Number: 5,370,581
[45] Date of Patent: Dec. 6, 1994

[54] TORSION DAMPING DEVICE, ESPECIALLY FOR A MOTOR VEHICLE

[75] Inventors: Dieter Rohrle, Montmorency; Ciriaco Bonfilio, Clichy, both of France

[73] Assignee: Valeo, Paris, France

[21] Appl. No.: 28,204

[22] Filed: Mar. 9, 1993

[30] Foreign Application Priority Data

Mar. 10, 1992 [FR] France ............... 92 02831

[51] Int. Cl.$^5$ .................. F16F 15/12; F16D 3/12
[52] U.S. Cl. ........................... 464/68; 464/89
[58] Field of Search ............ 464/66, 67, 68, 89; 192/106.1, 106.2

[56] References Cited

U.S. PATENT DOCUMENTS

| | | | |
|---|---|---|---|
| 3,556,273 | 1/1971 | Maucher | 192/106.2 |
| 4,152,906 | 5/1979 | Brown | 464/68 |
| 4,569,430 | 2/1986 | Raab et al. | 464/68 |
| 4,635,780 | 1/1987 | Wiuuen | 464/68 X |
| 4,747,800 | 5/1988 | Takeuchi | 464/68 X |
| 5,016,744 | 5/1991 | Fischer et al. | 192/106.2 |

FOREIGN PATENT DOCUMENTS

| | | |
|---|---|---|
| 0251849 | 1/1988 | European Pat. Off. |
| 1454232 | 9/1966 | France |
| 2595075 | 9/1987 | France |
| 2609132 | 7/1988 | France |
| 2660036 | 9/1991 | France |
| 3203648 | 9/1982 | Germany |
| 3114282 | 11/1982 | Germany |
| 3329259 | 2/1984 | Germany |
| 3841363 | 6/1990 | Germany |
| 2160296 | 12/1985 | United Kingdom |
| 2204379 | 11/1988 | United Kingdom |

*Primary Examiner*—Daniel P. Stodola
*Assistant Examiner*—Eileen A. Dunn
*Attorney, Agent, or Firm*—Longacre & White

[57] ABSTRACT

A torsion damping device comprises two coaxial masses and a friction device, which acts between the two coaxial masses and surrounds a central hub of the first mass. The friction device is a unitary assembly which comprises at least one element of elastic material, with a friction ring secured over at least one of its faces, for contact with a first friction surface carried by one of the coaxial masses. This unitary assembly is interposed, so as to be gripped radially, between the first friction surface and a second surface fixed to the other mass. The invention is applicable to torsion dampers for motor vehicles.

10 Claims, 3 Drawing Sheets

5,370,581

TORSION DAMPING DEVICE, ESPECIALLY FOR A MOTOR VEHICLE

FIELD OF THE INVENTION

The present invention relates in general to torsion damping devices, variously referred to as torsion dampers, especially but not exclusively for use in motor vehicles, being of the kind comprising two coaxial parts which are mounted for limited relative rotation of one with respect to the other against the action of circumferentially acting resilient means, the torsion damper also including a friction device.

BACKGROUND OF THE INVENTION

A damper of the above kind is described in the specification of United Kingdom published patent application GB 2 160 296A, in which one of the said coaxial parts comprises a first flywheel mass that includes a central hub, while the other coaxial part consists of a second flywheel mass which includes a plate carrying an outer hub internally, with the outer hub partly surrounding the central hub of the other coaxial part. A circumferentially acting torsion damper couples the first mass to the said plate of the second mass, while anti-friction bearing means are interposed radially between the inner and outer hubs.

This friction device acts in the axial direction between the first and second flywheel masses, and includes a friction ring which is in frictional contact with a first lateral friction surface which is fixed with respect to the first mass. The arrangement also includes a Belleville ring and an application ring which are driven in rotation without any clearance, by inter-engagement with a set of spacer bars which are part of the torsion damper.

Thus the friction device exerts a deflecting or biassing force on these spacer bars. These latter are quite long, so that the solidity of the torsion damper may be adversely affected.

Furthermore, the friction device consists of a large number of separate components, which complicates the assembly process, while the friction device also acts permanently between the two coaxial parts of the torsion damper, exerting a frictional damping effect of constant value at the said first friction surface.

It can be desirable to have only a light damping effect at the onset of the relative angular displacement between the first and second coaxial parts, followed by a larger (and frictional) damping effect during a second phase of this angular displacement. It follows that it is desirable that the friction means should be able to act with a varying clearance.

According to the disclosure in the above mentioned United Kingdom patent specification GB 2 160 296A, this objective leads to the provision of a loose meshing arrangement between the spacer bars of the torsion damper and the application ring, which complicates the double flywheel. Similarly, it is desirable to reduce the axial forces which, in the above mentioned United Kingdom specification GB 2 160 296A, are exerted by the friction device on the anti-friction bearing means.

DISCUSSION OF THE INVENTION

An object of the present invention is to overcome these drawbacks in a simple and cost-effective manner, and to provide a novel friction device which is very easy to fit but which also provides variable damping, with simplification of the double flywheel and reduction in the stresses on the anti-friction bearings.

According to the invention, a torsion damping device, especially for motor vehicles, of the kind comprising two coaxial parts which are mounted for rotation of one with respect to the other against the action of circumferentially acting resilient means, together with a friction device acting between the said coaxial parts, wherein one of the said parts comprises a first mass carrying a central hub, while the other one of the said parts comprises a second mass carrying a plate, which carries at its inner periphery an outer hub partially surrounding the said central hub, with antifriction bearing means being interposed radially between the outer hub and the central hub, the said friction device surrounding the said central hub, is characterised in that the friction device constitutes a unitary friction assembly which comprises at least one element of elastic material having at least one of its peripheral faces covering and secured to a friction ring for frictional contact with a first friction surface, the latter being oriented generally axially and being fixed with respect to either a first one of said masses or a second said mass, and in that the said unitary assembly is interposed radially in gripping relationship between the said first friction surface and a second surface, which is oriented generally axially and which is fixed with respect to the other one of the said masses.

With the arrangement according to the invention, assembly of the device is simplified because the friction device is in the form of a unitary assembly, i.e. a single built-up component. In addition, the anti-friction bearing means are less severely stressed, because the friction device is interposed between the first and second friction surfaces, which exert a radial gripping effect on it. The torsion damper is also simple and robust, and no loose coupling means need be provided between the friction means and either of the two rotating masses.

One of the friction surfaces is preferably formed on the outer periphery of the central hub, and the other friction surface is preferably fixed with respect to the outer hub. The friction device than constitutes in effect a second bearing which is interposed radially between the outer hub and the central hub, and it is this that relieves the stresses on the anti-friction bearing means during operation. Out-of-balance forces are also accommodated by the unitary friction assembly.

Thus the friction unit offers a number of advantages. In this connection also, during a first phase of the relative angular displacement between the two rotating masses, the damping effect is small and arises from the internal damping of the element of elastic (or resilient) material, which is squeezed between the friction ring and the second surface; there is no relative movement between the friction ring and the first friction surface, due to the arrangement whereby the unitary friction assembly is interposed between these two surfaces in such a way as to be gripped radially.

In a second phase of the relative angular movement, the torque which is transmitted will increase, so that relative movement takes place between the friction ring and the first friction surface. This increases the damping effect, so that damping then arises due to friction. In this way, variable damping is obtained, and this is of advantage in the context of a torsion damping device in the form of a double flywheel, as disclosed in United Kingdom patent specification GB 2 160 296A, in which a high damping effect at starting and stopping of the engine is required when passing through the resonant frequency. The elastic element preferably consists of a block, of annular shape formed with openings, in such a way that its stiffness (and therefore its damping effect) is reduced still more, both radially and circumferentially. The resulting construction is more easily adaptable to the kind of damping characteristics being sought.

The element of elastic material may be secured to the second surface, for example by adhesive bonding. However, this element is preferably bonded over its other peripheral face on to a second friction ring, which further simplifies fitting and prevents any wear taking place in the elastic element.

According to an important feature of the invention, the inner one of the two friction rings is thicker than the other ring, and is of divided form. With this arrangement, when the engine of the vehicle is working at high speed, the resulting centrifugal forces cause the radial gripping effect, and the friction, to decrease. In addition, a preferential friction effect takes place at the central hub.

Thus a very satisfactory compromise is reached in which: starting from the slow running mode of the engine, a small amount of damping is obtained, giving correct absorption of vibrations; on stopping and starting of the engine, the benefit of severe damping due to friction is obtained, with its consequent advantages; and when the vehicle is travelling, the reduced damping effect required is obtained.

Thus the same effects are produced, but in a simpler way, as are to be found in double flywheels which include a viscous means with loose coupling means, having fins for taking the viscous means out of service beyond a predetermined frequency threshold. In this connection, reference is invited for example to the specification of European patent No. EP 0 251 849B.

The annular block is preferably formed with radial slots, which may divide it into separate pieces, so as to accentuate the friction effects produced by centrifugal force.

According to another feature of the invention, the friction device is located radially inward of the torsion damper.

Further features and advantages of the invention will appear more clearly from the description of preferred embodiments of the invention which follows, and which is given by way of example only and with reference to the accompanying drawings.

DESCRIPTION OF PREFERRED EMBODIMENTS OF THE INVENTION

Figure 1:
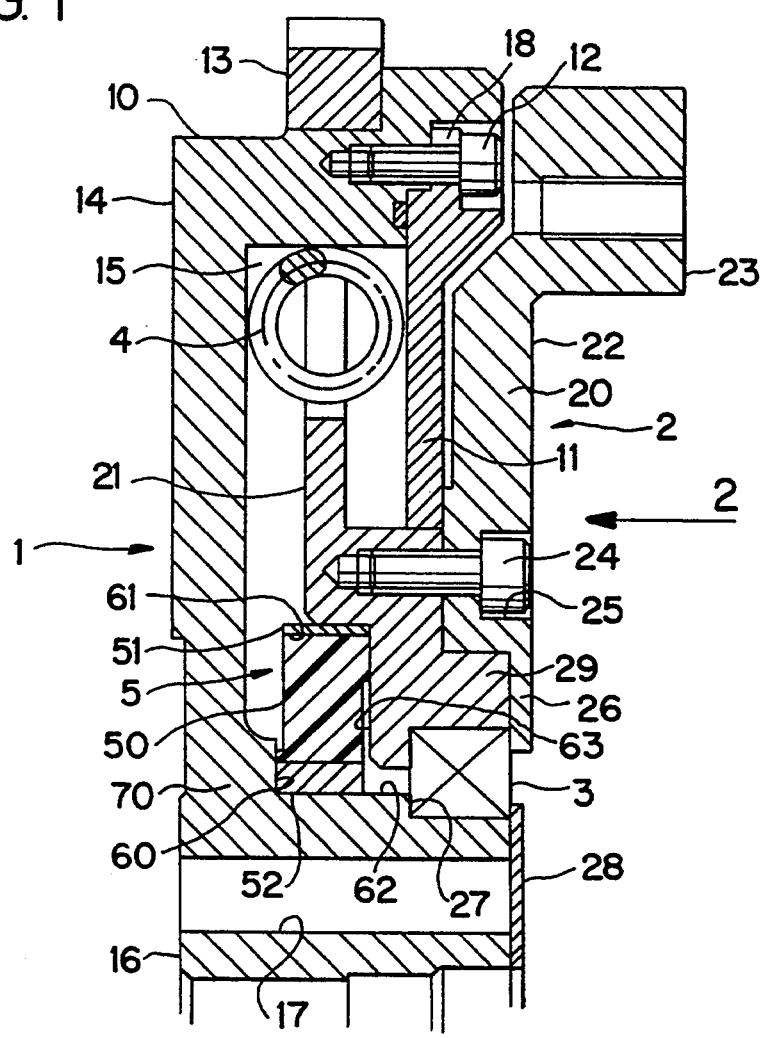
FIG. 1 is a half view in axial cross section of a torsion damper in the form of a double damped flywheel, in a first embodiment of the invention.
Figure 2:
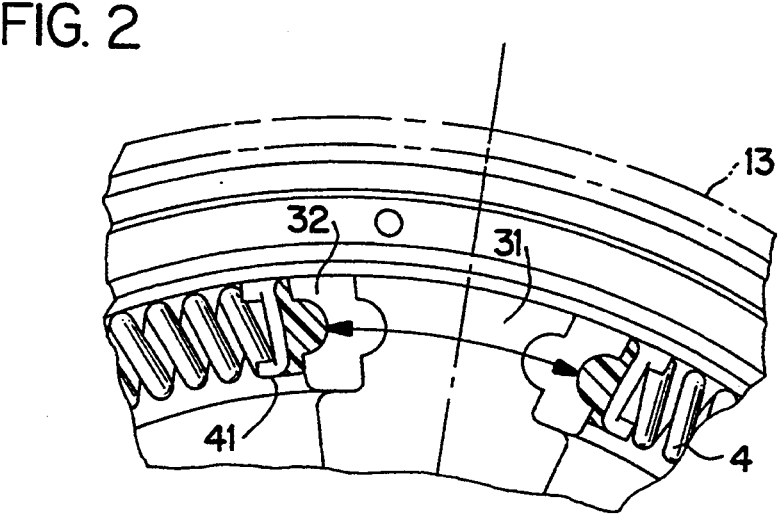
FIG. 2 is a partial view as seen in the direction of the arrow 2 in FIG. 1, with a cover plate and an annular plate, shown in FIG. 1, omitted.

The double damped flywheel, as illustrated in various forms in FIGS. 1 to 6, is a double flywheel incorporating a torsion damper and intended for a motor vehicle. It is of the kind which includes a first rotating mass 1, a second rotating mass 2, a circumferentially acting torsion damper 4, 21, 31, 32, 41, and a friction device 5 which acts axially between the first mass 1 and the second mass 2. The first rotating mass 1 includes a central hub 16, while the second rotating mass 2 comprises an annular plate 20 which carries an outer hub 29 on its radially inner part. The outer hub 29 partly surrounds the central hub 16. The torsion damper couples the first rotating mass 1 to the annular plate 20 of the second mass 20, and includes a securing portion 21 which is secured to the annular plate 20 by fastening means 24.

The first rotating mass 1 is the torque input or driven part of the torsion damping device, while the second rotating mass 2 is its torque output or driving part.

The second rotating mass 2 is mounted on the first mass 1, by means of anti-friction bearing means 3 which are interposed radially between the central hub 16 and the outer hub 29. More precisely, the first rotating mass 1 consists of generally annular components, namely a hollow housing 10, 14, which is in the form of a casting in this example and which includes a sealed, generally transverse, radial plate portion 14 which has an axially orientated flange 10 at its outer periphery. The central hub 16, together with a cover plate 11, are also part of the first rotating mass 1. The cover plate 11, together with the housing 10, 14, defines a sealed annular cavity 15 which is partly filled with grease. For this purpose, the cover plate 11 has at its outer periphery a portion 18 of reduced thickness, through which it is sealingly fastened on the flange 10, in this example by means of studs 12. FIG. 1 shows a sealing ring inserted between the cover plate 11 and flange 10. A toothed starter crown 13, arranged to be driven by the starter (not shown) of the vehicle in the usual way, is secured around the flange 10.

The central hub 16 is fixed to the radial plate portion 14, which will be referred to for convenience in the rest of this description as the main plate and which defines the base portion of the housing 10, 14. The central hub 16 projects axially from the base portion 14, and in this example it is integral with the housing. The latter is preferably made by casting.

The rotating mass 1 is coupled to the internal combustion engine of the motor vehicle, so as to be driven by the engine. To this end it is mounted on the crankshaft of the engine by means of screws (not shown), which pass through passages 17 formed in the central hub 16.

The second rotating mass 2 is mounted on the input shaft of the gearbox of the vehicle, via the clutch, so that the gearbox input shaft rotates with the second mass when the clutch is engaged. To this end, the annular plate 20 constitutes the reaction plate of the clutch. The remainder of the clutch is not shown in the drawings, but it includes a clutch friction plate in the usual way, secured to the gearbox shaft for rotation with the latter and being engaged in frictional contact with the reaction plate when the clutch is engaged. For more details, reference is invited to the specification of United Kingdom published patent application GB 2 160 196A. In this example the reaction plate 20 is a casting and has a friction surface 22, together with a fastening surface 23 to which the cover plate of the clutch is fastened.

The second rotating mass 2 also includes an annular damper plate 21 (referred to above as a securing portion). The damper plate 21 is of metal in this example and is coupled in rotation to the reaction plate 20, extending into the cavity 15 axially between the base 14 of the housing of the first rotating mass and the cover plate 11. The damper plate 21 is part of the torsion damper, and in this example it is integral with the outer hub 29, projecting axially outwardly from the latter. The cover plate 11 extends radially inwardly so as to surround the outer hub 29, around which it fits with a clearance small enough to prevent escape of grease from the cavity 15.

The damper plate 21 of the torsion damper is formed with radial arms 31 (see FIG. 2), which are arranged to interface between, and bear against, circumferentially acting resilient means 4 which are part of the torsion damper. In this example these resilient means 4 comprise a plurality of coil springs 4 of substantial length, which bear against projecting inserts 32. These inserts 32 are arranged in facing pairs, and are fixed to the cover plate 11 and the main plate 14, for example by riveting or by welding. The inserts 32 are also part of the torsion damper, as are the arms 31. The inserts 32 are slotted for cooperation with thrust pads 41, against which the ends of the springs 4 are engaged. In the present example, the springs 4 are mounted without any clearance between themselves and the insert blocks, 32, but with a clearance with respect to the arms 31. The springs 4 may alternatively of course be mounted without clearance with respect to the arms 31, depending on the desired application. The springs 4 extend to the inner periphery of the flange 10, and are lubricated by the grease in the cavity 15, which increases their useful life.

The friction device 5 surrounds the central hub 16, on which the anti-friction bearing means 3 are mounted. In the present example the latter comprise a ball bearing with a single ball race. However, in a modification, the bearing means 3 may consist of a bearing having two ball races, as disclosed in the specification of published United Kingdom patent application GB 2 160 296A; or they may comprise a journal bearing of a suitable anti-friction material.

The bearing 3 is interposed radially between the central hub 16 and the outer hub 29 fixed to the reaction plate 20, being carried on the latter by the fastening means 24 already mentioned. The outer hub 29 extends as far as the inner periphery of the reaction plate 20, and has an internal bore which is formed with a shoulder for engagement with the outer ring of the bearing. The latter is engaged in the bore of the outer hub 29, on which it is located axially by the above mentioned shoulder, and by an inward radial extension 26 of the reaction plate 20.

The bearing 3 is located axially on the hub 16, partly by means of a radial ring 28 and partly by means of a shoulder 27 which is defined by a change of diameter of the central hub 16. The head of the fastening screws mentioned above, whereby the hub 16 is secured to the crankshaft of the engine, bear on the radial ring 28. The second rotating mass 2 is thus located axially on the first rotating mass 1, but is rotatable with respect to the latter by means of the anti-friction bearing 3.

The friction device 5 constitutes a unitary friction assembly comprising at least one element 50 of resilient (elastic) material. A friction ring 51, for frictional contact with a first friction surface 62, is applied over, and secured to, at least one of the peripheral faces of the elastic element 50. The friction surface 62 is oriented in a generally axial direction and is fixed to either the first mass 1 or the second mass 2. The unitary assembly 5 is interposed radially, and gripped, between the first friction surface 62 and a second surface 61. This latter is again oriented generally axially and is fixed with respect to that one of the masses 1 and 2 which does not carry the first surface 62. The unitary assembly 5 is thus mounted radially under precompression (the amount of which is dependent on the particular application) between the two surfaces 61 and 62.

In this example the first surface 62 is endless and is part of the central hub 16. More precisely, the surface 62, oriented axially, is defined by that portion of the outer periphery of the hub 16 that is of greatest diameter. It is thus of annular cylindrical form, and it extends radially in facing relationship to the other surface 61.

The hub 16 is carried integrally by the main plate 14 at its inner periphery. In a modification, the hub 16 could be a separate component suitably secured to the main plate 14.

The central part of the housing is stepped, so as to define a thickened portion 70 which projects axially towards the central hub 29, and which defines a radial shoulder 60 for axial abutment with the unitary friction assembly 5. The lateral face of the annular hub 29 which is directed towards the main plate 14, is recessed so as to define a transverse (radial) surface 63 for axial abutment with the friction device 5.

The second friction surface 61 is defined by an axially oriented face of the outer hub 29 facing towards the central hub 16. In this example, this surface 61 is in the form of an annular cylinder surrounding the hub 16.

Figure 3:
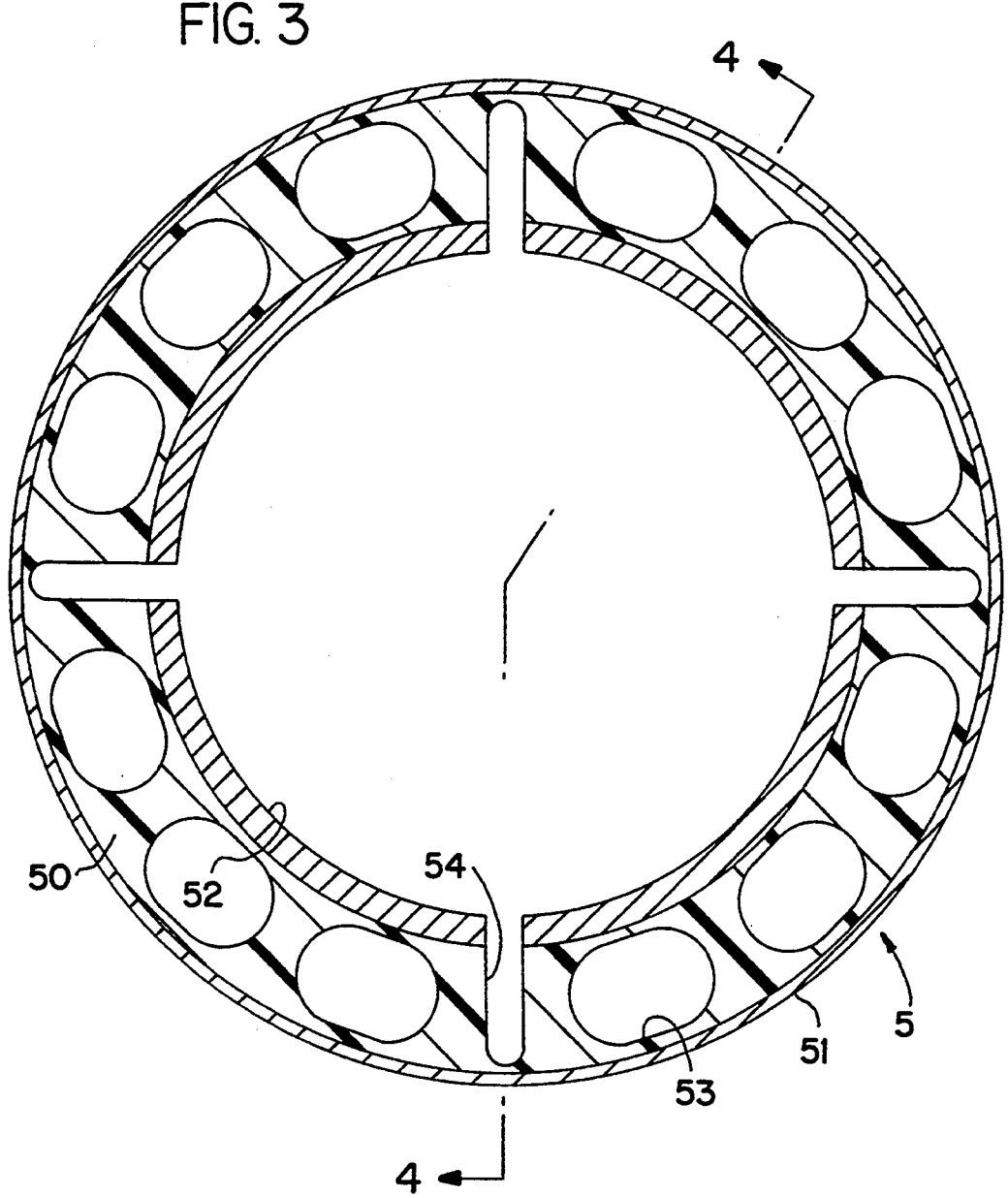
FIG. 3 is a view in axial cross section of the friction device of FIG. 1.

In FIGS. 1 to 4, the elastic element 50 is an annular block. In this example it is a block of elastomeric material such as rubber. A pair of coaxial metallic rings, namely the friction ring 51 and an inner ring 52, both of which are of metal, are bonded to the outer and inner peripheral surfaces respectively of the block 50, for frictional contact with the cylindrical surfaces 61 and 62 respectively. The friction device 5 is located radially inward of the damper plate 21, with its block 50 being thicker (deeper) radially than the rings 51 and 52. The outer ring 51 is thinner than the inner ring 52. The ring 52 is discontinuous as is shown in FIG. 3.

The block 50 is also made thicker in the axial direction at its outer periphery, as can be seen in FIG. 1, so as to make local contact with the radial surface 63, while the inner ring 52 is offset axially from the outer ring 51, and has a radial thickness smaller than that of the associated shoulder 60. The block 50 is also locally extended in the axial direction towards this shoulder 60, so that it can be bonded over the whole outer cylindrical surface of the ring 52. This arrangement enables the unitary assembly 5 to be easily assembled, and gives it excellent mechanical strength.

It will be noted that the outer ring 51 is wider axially than the associated surface 61, but this is of course not necessarily so, in that the surface 61 can be of the same axial width as the outer ring 51. This can be achieved simply by local elongation of the outer hub 29. It will also be noted that the cavity 15 is closed by the unitary assembly 5, together with the outer hub 29 and the thickened portion 70.

Securing of the outer and inner rings 52 to the block 50 can be achieved by the use of an adhesive, or by integral bonding, for example by in situ vulcanisation of the rubber of the block 50 on the metal rings 51 and 52.

Figure 4:
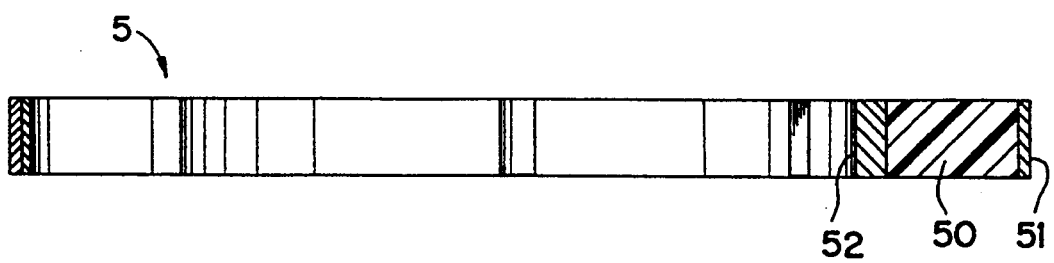
FIG. 4 is a view in cross section taken on the line 4—4 in FIG. 3.

The block 50, which can conveniently be made by moulding, is preferably provided with apertures 53. The apertures 53, shown clearly in FIGS. 3 and 4, are oriented axially, and are in the form of oblong holes which in this example are elongated in the circumferential direction and extend axially right through the block 50. These apertures reduce the radial and circumferential stiffness of the ring 50, and are spaced apart circumferentially at regular intervals.

In addition, radial slots 54 separate the consecutive sectors of the divided inner ring 52, and are formed in the block 50 through almost the whole of its radial depth. In this example, a thin web of rubber remains between the outer ring 51 and the radially outer, or closed, end of each radial slot 54. These slots are accordingly in the form of blind holes, an arrangement which exists of course simply to facilitate moulding: the slots 54 can if desired be formed through the entire radial depth of the block 50, so that the latter then becomes four separate pieces.

Thus, in this example, the outer ring 51 encloses four elastic segments which are bounded internally by the annular segments of the inner ring 52. All of this facilitates assembly of the unitary friction device 5 on to the central hub 16, which is obtained by simply threading it on to the latter. It also enables the radial gripping effect to be reduced as is described below, when the vehicle is in motion. This reduction in radial force is enhanced by the holes 53, which extend over almost the entire radial depth of the block 50, and by the fact that only a very small thickness of material remains between the holes 53 and the respective rings 51 and 52.

The double damped flywheel described above operates in the following way.

As the vehicle moves, the housing 10, 14 and the cover plate 11 first become displaced circumferentially with respect to the arms 31, thus displacing the springs 4 until the thrust pads 41 come into contact with the arms 31, the springs 4 then being compressed so as to couple the first rotating mass 1 to the reaction plate 20. The relative angular displacement between the two rotating masses 1 and 2 is limited by inter-engagement of the turns of the springs 4.

During the relative angular displacement of the mass 1 with respect to the mass 2, the friction device 5 is compressed axially between the two surfaces 61 and 62. At first this gives a slight damping effect, without any relative movement of the friction device 5 with respect to the surfaces 61 and 62. This slight damping damping effect is due to internal damping in the rubber of the block 50, which is squeezed between the two rings 51 and 52.

As the relative angular displacement between the two rotating masses 1 and 2 increases, the torque transmitted, and also the damping effect, will also increase. A relative movement then occurs between the unitary friction assembly 5 and one of the friction surfaces 61 and 62, so that there is then a frictional damping effect.

During starting or stopping of the engine, the rotational velocity passes through the resonant frequency of the double flywheel, and a large angular displacement occurs between the first and second rotating masses; the friction device 5 now produces a high damping effect by friction, with one of the rings 51 and 52 rubbing in contact with the associated surface 61 or 62.

Thus, in order to absorb vibrations when the engine is idling, a slight damping effect is available; whereas, with large relative angular displacements between the rotating masses 1 and 2, and particularly on stopping and starting of the engine of the vehicle, a much larger damping effect is made available by friction.

Normally it is the outer ring 52 which makes frictional contact with the internal surface 62, because this ring is of cast form.

The positive and reliable functioning of the double flywheel will be appreciated. In this connection, if seizing occurs at the inner surface 62, the device is still able to operate, but with the friction then occurring at the outer surface 61. In this case it is the inner ring 51 which provides the friction.

It will be noted that the rings 51 and 52 constitute anti-wear means, preventing any frictional contact occurring between the block 50 and the surfaces 61 and 62.

It will also be appreciated that when the vehicle is in motion, the radial gripping effect is reduced. Thus under the influence of centrifugal force, the segments of the inner ring 52 are displaced radially towards the associated surface 61, thus reducing the gripping effect and the damping effect which is required in a damped double flywheel. In this latter connection, a high degree of damping must occur on stopping and starting of the vehicle, without unduly interfering with the operation of the damped double flywheel when the vehicle is in motion.

The bearing 3 is subject to reduced applied forces, and may in fact be made of a reduced size since the unitary assembly 5 constitutes, in effect, a second bearing which centres the second flywheel mass on the central hub 16. In operation, centrifugal forces set up by out-of-balance forces are therefore of smaller magnitude in the vicinity of the bearing 3. The useful life of the latter can thus be extended.

The friction assembly 5 is also mounted under axial pre-compression between the radial surfaces consisting of the shoulder 60 and the surface 63, so that an axial pre-loading force is exerted on the outer hub 29 and the annular plate 20, with a reduction in the axial forces which are exerted on the bearing 3 during the declutching operation. In addition, the axial and radial forces exerted on the bearing 3 during operation are reduced. In this connection, the reaction plate 20 will not always have perfect geometry, so that clearances (especially radial clearances) may appear in the vicinity of the bearing. Due to the operation of the unitary friction assembly 5, hunting or oscillating movements of the plate 20 will be reduced, as will the axial and radial forces exerted on the bearing.

It will be appreciated that the reduction in radial gripping force is clearly facilitated by the holes 53 and slots 54, which enable deformations to be well controlled. Thus, when the double flywheel is rotating at high speed, friction between the inner ring and the associated surface 62 is reduced.

Figure 5:
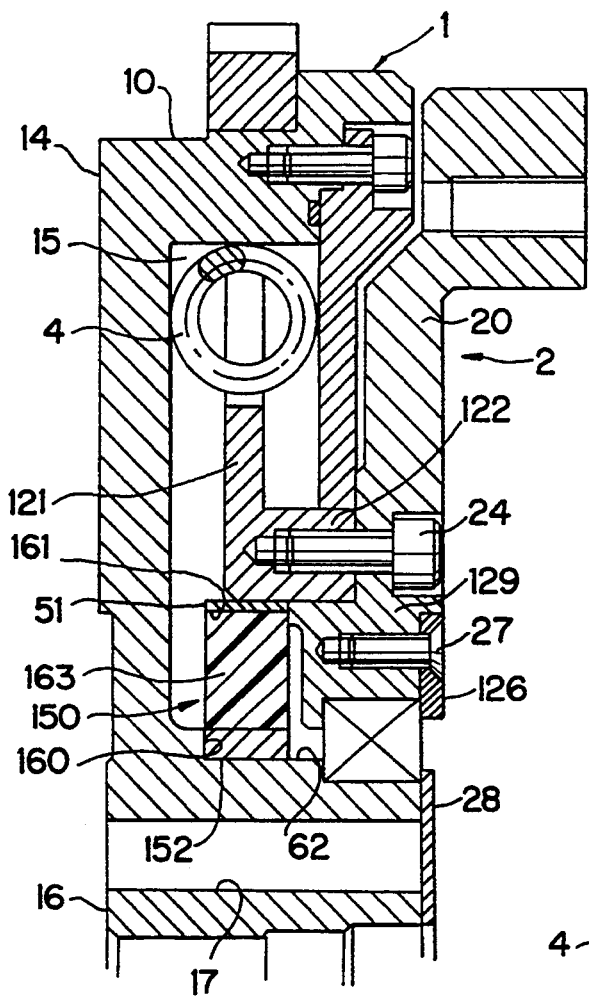
FIG. 5 is a view similar to FIG. 1, but shows a second embodiment of the invention.

The present invention is of course not limited to the embodiment described above. FIG. 5 shows one modified version within the scope of the invention. Referring to FIG. 5, the damper plate 121 here has an L-shaped cross section, the central portion 122 of which is tubular in form, and the damper plate is carried on the annular plate 20 by means of the securing screws 24. In this example the plate 20 is integral with the outer hub 129 which defines the inner periphery of the plate 20.

The hub 129 defines a centring nose for the central portion 122. A ring 126 is carried on the hub 129, to which it is secured by means of screws 27. This ring 126 thus defines the shoulder for the outer ring of the rolling bearing 3.

In this embodiment, the second surface 161 is formed on the inner periphery of the central portion 122 of the damper plate 121, which is secured directly to the hub 129; and the block 150 of resilient material is of uniform thickness. An annular collar 163 is formed on the outer periphery of the hub 129 immediately adjacent to the tubular portion 122, the unitary assembly being fitted in engagement with this collar. The radial shoulder 160 of the main plate 14 is of reduced radial depth. Fitting of the friction assembly, and retention of the latter in position, are thus obtained, as in FIG. 1, in a highly satisfactory way between the various surfaces 161, 163, 62 and 160. As in FIG. 1, narrow clearances are provided at the level of the central hub 129 such that grease cannot escape, so that the cavity 15 is thus effectively sealed.

Figure 6:
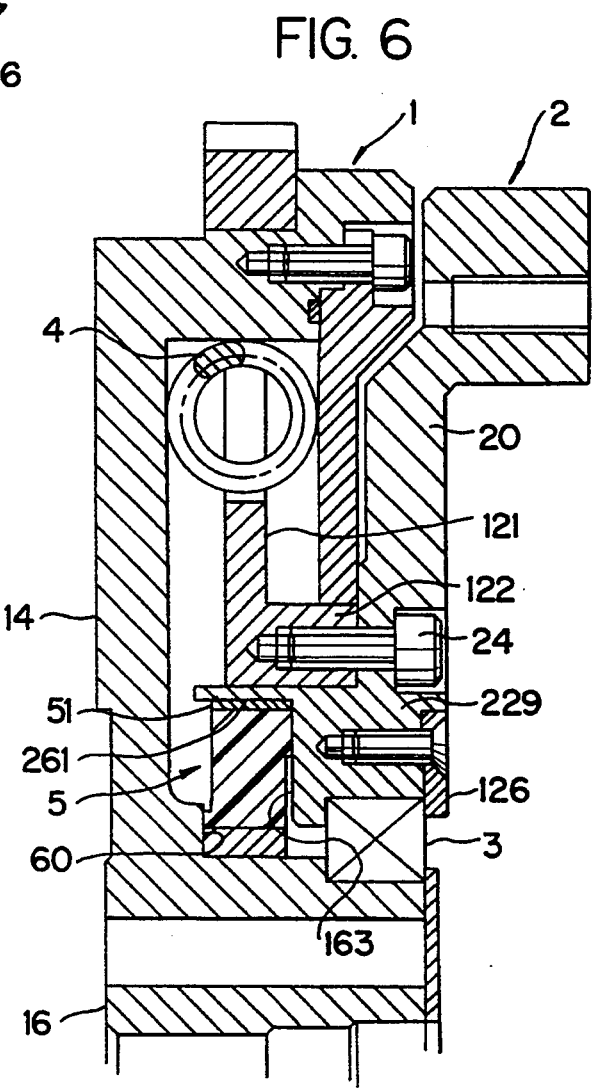
FIG. 6 is a view similar to FIG. 1, but shows a third embodiment of the invention.

Referring now to FIG. 6, this shows a further modified embodiment, in which the outer friction surface 261 is formed on the annular plate 20, integrally with the outer hub 229. In this case, and by contrast with FIG. 1, the ring 51 is fully in contact with the outer friction surface 261.

In another possible modification (not shown), the unitary friction assembly 5 comprises only a single block of resilient material, having a friction ring fitted over one of its peripheral faces for frictional engagement on the appropriate axial friction surface.

The block is preferably secured to the outer hub 29 by, for example, adhesive bonding, or alternatively by in situ vulcanisation. However, the reverse is also possible. In all cases, this attachment, like the friction ring, provides an anti-wear facility which avoids the occurrence of any frictional contact between the surface concerned and the resilient element 150 itself. The inner ring can of course be made continuous, and it may have the same thickness as the outer ring. In that case the friction surface may be the surface 61, with no relative movement occurring at the surface 62.

In operation, the friction occurring between the ring 51 and the outer friction surface 61 is increased under the effect of centrifugal force.

Over the working life of the vehicle, the friction conditions will of course change, and the friction surfaces may be reversed so that friction then takes place at the second surface. The friction device is thus extremely reliable and will work even when seizing occurs at one of the friction surfaces.

The friction rings (or ring), instead of being made of metal, may be of any other appropriate friction material. In all cases the central hub requires no machining, and nor does the outer hub, in order to enable a friction ring, of any kind, to rotate.

Again, the solid and hollow parts may be reversed. Thus, in a modification of the components shown in FIGS. 3 and 4, the two rings 52 and 51 may be joined together through a plurality of elements of a suitable elastic material, in the form of pads which are elongated either circumferentially or radially, and which are spaced apart circumferentially at regular intervals. In a further modification, the rings 52 and 51 may again be joined together by elements made of a suitable resilient material, but here these elements are in the form of disc-shaped pads, which may be provided with central holes.

The apertures 53 and the slots 54 may be blind, with a continuous thin web defining the bases of the apertures 53 and slots 54, thus ensuring perfect sealing at the inner periphery of the cavity 15.

The block of elastic material may be made wider than its height. The lateral friction surfaces are not necessarily cylindrical. Thus at least one of them may be frusto-conical in shape, with the unitary assembly then having at least one frusto-conical side face, and the block itself having a frusto-conical side face.

Finally, the elastic element may be of a reticulating elastic material which is adherent after being deposited. For example, in the case of concentric rings, the latter may be applied on to one of the rings, using a nozzle, so that adhesive bonding then takes place. A silicone paste may for example be used, such as that marketed by the company Rhône-Poulenc under the Trade Mark RHODORSEAL.

What is claimed is:

1. A torsion damping device, comprising first and second coaxial parts which are mounted for rotation of one with respect to the other against the action of circumferentially acting resilient means, together with a friction device acting between said coaxial parts, said first part comprising a first mass carrying a central hub, said second part comprising a second mass carrying a plate, which carries at its inner periphery an outer hub partially surrounding said central hub, and anti-friction bearing means interposed radially between the other hub and the central hub for reducing frictional resistance, said friction device surrounding said central hub, wherein the friction device constitutes a unitary friction assembly which comprises at least one element of elastic material having at least one of its outer and inner peripheral faces covering and secured to a friction ring for frictional contact with a first friction surface, the first friction surface being oriented in a generally axially direction and being fixed with respect to one of said first and second masses, said unitary friction assembly being interposed radially in gripping relationship between said first friction surface and a second surface, which is oriented in a generally axially direction and which is fixed with respect to the other of said first and second masses.

2. A torsion damping device according to claim 1, wherein said friction ring is divided.

3. A torsion damping device according to claim 1, wherein one of said first and second surfaces is defined on the outer periphery of the central hub, the other surface being defined on the outer hub.

4. A torsion damping device according to claim 1, wherein the unitary friction assembly comprises at least one element of elastic material having inner and outer peripheral faces, with a friction ring being secured over each of its inner and outer peripheral faces for frictional contact with said second surface and first friction surface respectively.

5. A torsion damping device according to claim 1, wherein the said element of elastic material defines apertures therein.

6. A torsion damping device according to claim 5, wherein each said aperture is in the form of an oblong hole.

7. A torsion damping device according to claim 5, wherein the element of elastic material defines a plurality of radial slots therein.

8. A torsion damping device according to claim 5, wherein the unitary friction assembly comprises said element of elastic material defining an inner periphery and an outer periphery thereof, a divided inner ring secured over its inner periphery, and an endless outer ring secured over its outer periphery.

9. A torsion damping device according to claim 8, wherein the thickness of the inner ring is greater than that of the outer ring.

10. A torsion damping device according to claim 5, wherein the outer hub defines a transverse surface, said element of elastic material defining an axially thickened portion thereof at its outer periphery for contact with the said transverse surface of the outer hub, the inner ring being offset axially with respect to the outer ring.

* * * * *